(12) United States Patent
He et al.

(10) Patent No.: US 11,162,659 B2
(45) Date of Patent: Nov. 2, 2021

(54) LENS, LENS GROUP AND LAMP

(71) Applicants: Self Electronics Co., Ltd., Zhejiang (CN); Wanjiong Lin, Zhejiang (CN); Self electronics USA Corporation, Norcross, GA (US)

(72) Inventors: Zuping He, Zhejiang (CN); Yuanfang Xue, Zhejiang (CN); Dong Chen, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 16/988,031

(22) Filed: Aug. 7, 2020

(65) Prior Publication Data
US 2021/0041080 A1 Feb. 11, 2021

(30) Foreign Application Priority Data
Aug. 9, 2019 (CN) .......................... 201910735332.7

(51) Int. Cl.
| | |
|---|---|
| *F21V 5/04* | (2006.01) |
| *G02B 9/04* | (2006.01) |
| *G02B 19/00* | (2006.01) |
| *F21Y 115/10* | (2016.01) |

(52) U.S. Cl.
CPC ................ *F21V 5/04* (2013.01); *G02B 9/04* (2013.01); *G02B 19/0066* (2013.01); *F21Y 2115/10* (2016.08)

(58) Field of Classification Search
None
See application file for complete search history.

(56) References Cited

U.S. PATENT DOCUMENTS

| | | | |
|---|---|---|---|
| 2011/0058357 A1* | 3/2011 | Anderson | A47F 3/001 362/125 |
| 2016/0377257 A1* | 12/2016 | Xu | F21V 5/08 362/224 |
| 2016/0377258 A1* | 12/2016 | Xu | F21S 4/28 362/223 |
| 2017/0370539 A1* | 12/2017 | Xu | F21S 4/28 |
| 2018/0051863 A1* | 2/2018 | Lee | G02B 19/0061 |
| 2018/0142846 A1* | 5/2018 | Liu | F21S 4/28 |
| 2018/0231213 A1* | 8/2018 | Kang | F21V 5/04 |
| 2020/0200360 A1* | 6/2020 | He | F21V 33/0044 |
| 2021/0048164 A1* | 2/2021 | Xu | F21S 4/28 |

* cited by examiner

*Primary Examiner* — Elmito Breval
(74) *Attorney, Agent, or Firm* — Wang Law Firm, Inc.

(57) ABSTRACT

A lens includes a light source installation location, a second lens surface and a first lens surface, the light source installation location has a main optical axis passing through the second lens surface and the first lens surface, and on a plane perpendicular to the main optical axis, there are a first dimming axis and a second dimming axis that are perpendicular to each other and intersecting the main optical axis, the first lens surface includes a first light-focusing curved surface locating along the direction of the first dimming axis and on one side of the main optical axis, and at least part of the first lens surface on the other side of the main optical axis is diffusion curved surface; the first lens surface includes a second light-focusing curved surface along the direction of the second dimming axis.

15 Claims, 7 Drawing Sheets

LENS, LENS GROUP AND LAMP

RELATED APPLICATION

This application claims priority to a Chinese Patent Application No. CN 201910735332.7, filed on Aug. 9, 2019.

FIELD OF THE TECHNOLOGY

The present invention relates to the field of lighting technology, with particular emphasis on an a lens, lens group and lamp.

BACKGROUND OF THE INVENTION

Compared with traditional lighting lamps, LED lamps have the advantages of small size, low energy consumption and high light efficiency, so LED lamps can be quickly promoted and applied. At the same time, people are constantly pursuing better lighting effects, so they also hope that LED lamps can meet various lighting needs. Especially in the case of large area and long-distance irradiation required, it is desirable to make the illumination of the illuminated area as uniform as possible. Since the light-emitting effect of the LED chip cannot meet the lighting requirements, it is necessary to perform secondary optical design through cooperating with lens to meet specific light distribution requirements. According to the law of light irradiation, compared to the irradiated area where the light irradiated distance is short, the farther the light irradiates, the stronger the scattering, and the larger the irradiation range, therefore, the farther the irradiated distance, the smaller the illuminance, resulting in uneven illumination.

In order to solve the above problems, uniform lighting is achieved by designing a lens having light-gathering effect. However, improving the light-gathering effect is only suitable for small-area lighting. If large-area uniform lighting is required, multiple LEDs are required if the above method is also used, resulting in high manufacturing cost.

BRIEF SUMMARY OF THE INVENTION

In view of this, the present invention provides a lens, lens group and lamp to solve the above technical problems.

A lens, comprising a light source installation location, a second lens surface and a first lens surface, the light source installation location has a main optical axis passing through the second lens surface and the first lens surface. on a plane perpendicular to the main optical axis, there are a first dimming axis and a second dimming axis that are perpendicular to each other and intersecting the main optical axis. the first lens surface includes a first light-focusing curved surface locating along the direction of the first dimming axis and on one side of the main optical axis, and at least part of the first lens surface on the other side of the main optical axis is diffusion curved surface; the first lens surface includes a second light-focusing curved surface along the direction of the second dimming axis.

advantageously, the first light-focusing curved surface and the diffusion curved surface are connected by a third light-focusing curved surface.

advantageously, the curvature of the third light-focusing curved surface gradually decreases from the first light-focusing curved surface toward the diffusion curved surface.

advantageously, the first light-focusing curved surface, the third light-focusing curved surface and the diffusion curved surface is in smooth transition connection.

advantageously, the second lens surface is a concave arc surface along the main optical axis toward the first lens surface, and the light source installation location (100) is located outside the second lens surface.

A lens group, characterized by comprising a plurality of lenses described above, and the lenses are arranged at intervals along the second dimming axis.

advantageously, the lens group further comprises a mounting plate for fixing the lens.

advantageously, the mounting plate is provided with a plurality of mounting holes, and each mounting hole is correspondingly provided with a lens and connected with the second lens surface.

advantageously, the mounting plate and the lens are integrally formed and manufactured.

A lamp comprises:
lamp holder;
circuit board, set on the lamp holder;
light source, arranged on the circuit board;
lens, adopting the lens described above, and the light source is arranged on the light source installation place and the central axis of the light source installation place is coincident with the main optical axis.

advantageously, the lamp holder and the circuit board are in strips and their length direction extends along the second dimming axis, and there are a plurality of light sources arranged at intervals along the second dimming axis, and correspondingly, a plurality of lens is respectively arranged on the corresponding light source.

advantageously, the circuit board is provided with two, the width directions of which are symmetrical and oblique to each other, and the light source is arranged on the outer side of the circuit board.

Technical Effects of the Invention

In the lens, lens group and lamp of the present invention, the light of the light source is distributed in the cross section (the direction of the first dimming axis) through the light distribution of the lens, so that more light is irradiated to the far end of the illuminated surface and diffused at the near end. A convex lens is used to focus the lambertian distributed light in the direction of the second dimming axis. The light distribution in two directions realizes the uniformity of the illumination on the illuminated surface and improves the light efficiency.

BRIEF DESCRIPTION OF THE DRAWINGS

The following describes embodiments of the present invention with reference to the accompanying drawings, in which.

DETAILED DESCRIPTION OF THE INVENTION

Hereinafter, specific embodiments of the present invention will be described in further detail based on the drawings. It should be understood that the description of the embodiments of the present invention is not intended to limit the protection scope of the present invention.

Embodiment 1

As shown in FIGS. 1-7, the lens 1000 of this embodiment includes a light source installation location 100, a second lens surface 200, and a first lens surface 300. The light source installation location 100 has a main optical axis 101 passing through the second lens surface 200 and the first lens surface 300. On a plane perpendicular to the main optical axis 101, there are a first dimming axis 102 and a second dimming axis 103 that are perpendicular to each other and intersecting the main optical axis 101. The first lens surface 300 includes a first light-focusing curved surface 201 locating along the direction of the first dimming axis 102 and on one side of the main optical axis 101, and at least part of the first lens surface 300 on the other side of the main optical axis 101 is diffusion curved surface 202. The first lens surface 300 includes a second light-focusing curved surface 301 along the direction of the second dimming axis 103.

Figure 1:
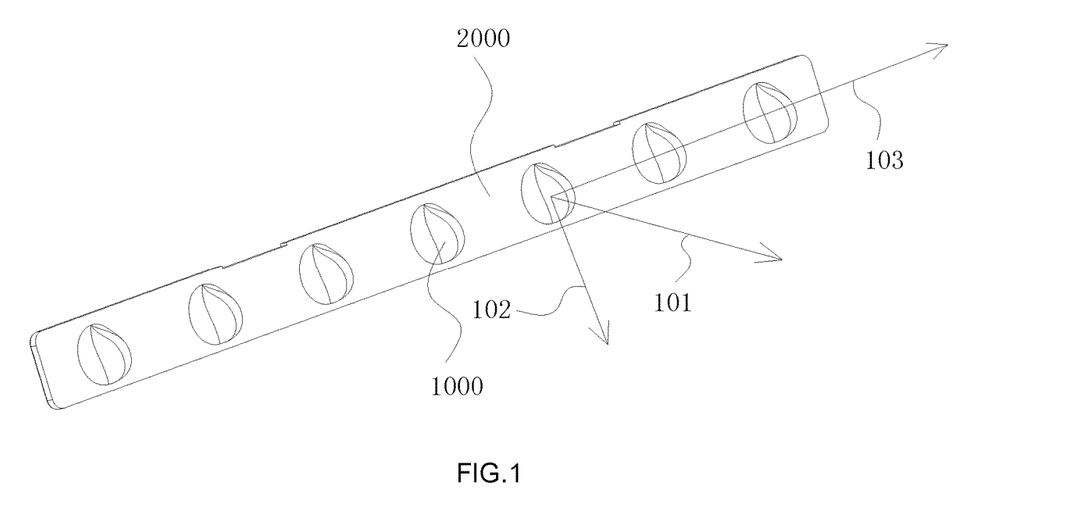
FIG. 1 is a schematic diagram of the structure of the lens group of embodiment 1.
Figure 2:
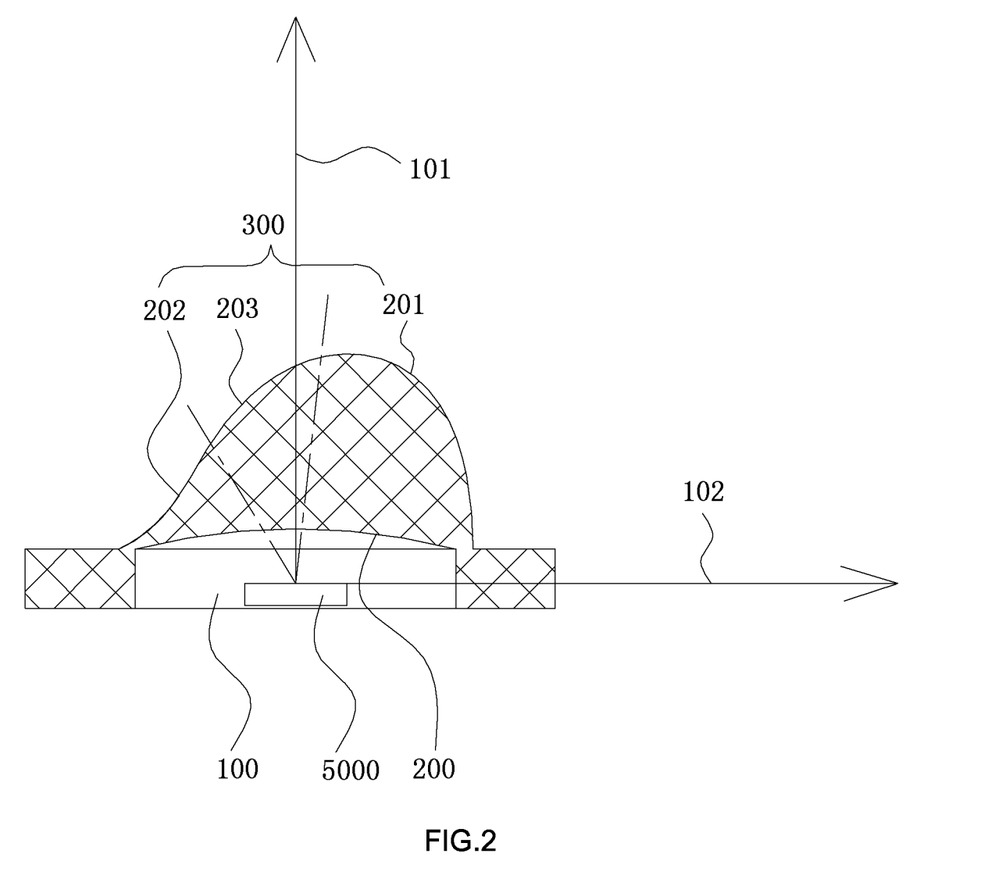
FIG. 2 is a schematic cross-sectional view of the lens group of embodiment 1 in the first dimming direction.
Figure 3:
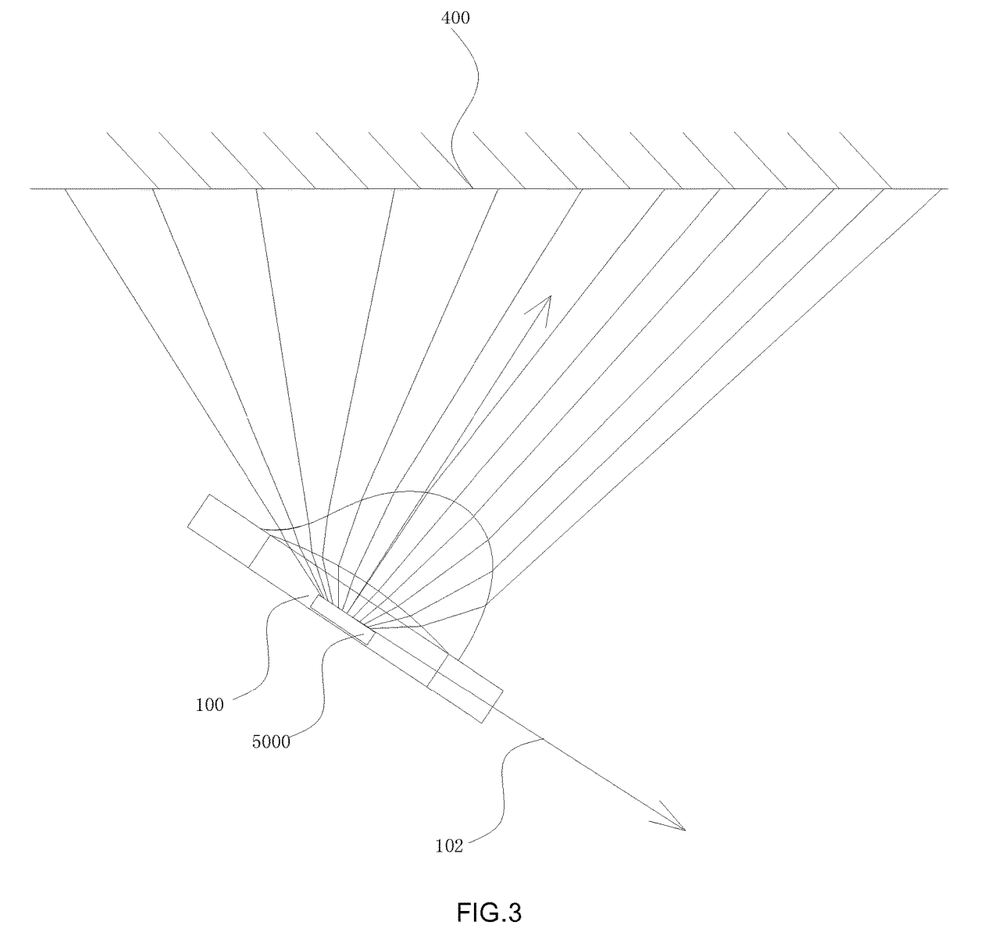
FIG. 3 is a schematic diagram of the light distribution of the lens group of embodiment 1 in the first dimming direction.

The lens of this embodiment is drop-shaped with a smooth transition as a whole. In the prior art, the lens of this type of structure focuses light in the circumferential direction and controls the light output angle. In this embodiment, in order to increase the illumination range and uniformity of illumination, the main optical axis 101 of the light source installation location 100 is inclined to the illuminated surface 400. At this time, the first dimming axis 102 is inclined to the illuminated surface 400, the second dimming axis 103 is horizontal to the illuminated surface 400. The first lens surface 300 is used for the light distribution. The first lens surface 300 includes a first light-focusing curved surface 201 locating along the direction of the first dimming axis 102 and on one side of the main optical axis 101 (the side far from the illuminated surface 400), and at least part of the first lens surface 300 on the other side of the main optical axis 101 (the side close to the illuminated surface 400) is diffusion curved surface 202. The first light-focusing curved surface 201 can focus the light from the light source and project it to the far end of the illuminated surface 400. The side close to the illuminated surface 400 of the first lens surface 300 can be the diffused curved surface 202 partially or completely. The diffused curved surface 202 guides the light emitted from the light source to the proximal end of the illuminated surface 400, so as to diffuse part of the light close to the illuminated surface, so as to obtain uniform illumination with a large irradiation range.

Figure 4:
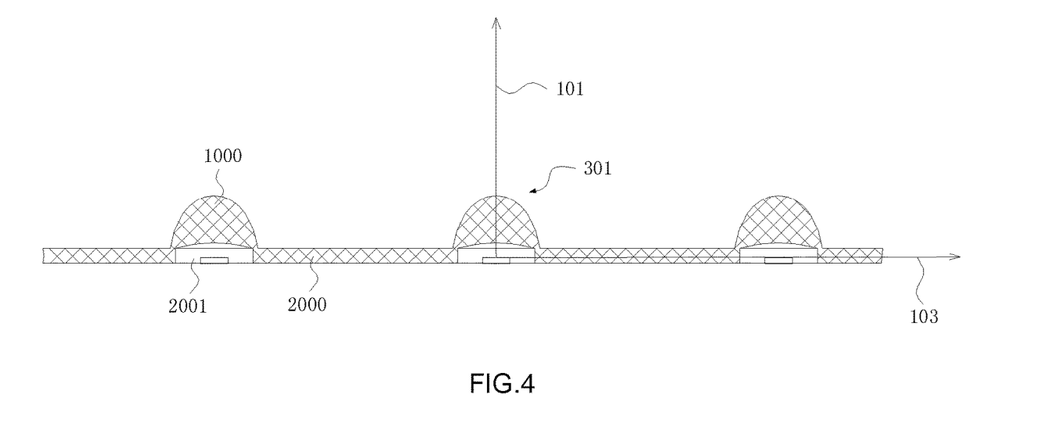
FIG. 4 is a schematic cross-sectional view of the lens group of embodiment 1 in the second dimming direction.

The first lens surface 300 includes a second light-focusing curved surface 301 along the direction of the second dimming axis 103, which achieves the light-gathering effect in the direction parallel to the illuminated surface 400 and improves the light efficiency, especially when multiple light sources are arranged continuously in this direction. After focusing, it can maintain higher light efficiency and uniformity in this direction.

The curvature of the light-focusing curved surface is a positive curvature, and the curvature of the diffusion curved surface transits from positive curvature to negative curvature, thus, the illumination on the illuminated surface is more uniform and the irradiation range is wider. In this embodiment, the first light-focusing curved surface 201 and the diffusion curved surface 202 is connected by a third light-focusing curved surface 203. In addition, the curvature of the third light-focusing curved surface 203 gradually decreases from the first light-focusing curved surface 201 toward the diffusion curved surface 202. More preferably, the first light-focusing curved surface 201, the third light-focusing curved surface 203 and the diffusion curved surface 202 is in smooth transition connection.

the second lens surface 200 is a concave arc surface along the main optical axis 101 toward the first lens surface 300, and the light source installation location 100 is located outside the second lens surface 200. The second lens surface 200 and the first lens surface 300 are arranged in a continuous curved structure, so that the intensity of light in the illumination area will not be in sharp contrast with the ambient brightness, so that the light on the irradiation surface 400 will not cause strong visual discomfort.

The lens group of this embodiment includes a plurality of lenses 1000, and the lenses 1000 are arranged at intervals along the second dimming axis 103. In this way, continuous and efficient illumination is achieved in the direction of the second dimming axis 103, and a single row of light sources on the first dimming axis 102 can achieve large-angle uniform illumination. In order to facilitate installation and manufacture, the lens group also includes a mounting plate 2000 for fixing the lens 1000. At the same time, in order to facilitate the installation of the light source, a plurality of mounting holes 2001 are provided on the mounting plate 2000 and the mounting holes 2001 can be used as the light source installation locations 100. Each mounting hole 2001 is correspondingly provided with a lens 1000 and connected with the second lens surface 200. The mounting plate 2000 and the lens 1000 can be fixedly connected in many ways, such as glue bonding and screw locking or the other ways. In order to facilitate manufacturing and simplify the structure, in this embodiment, the mounting plate 2000 and the lens 1000 are made of the same material and are manufactured in one piece.

Figure 5:
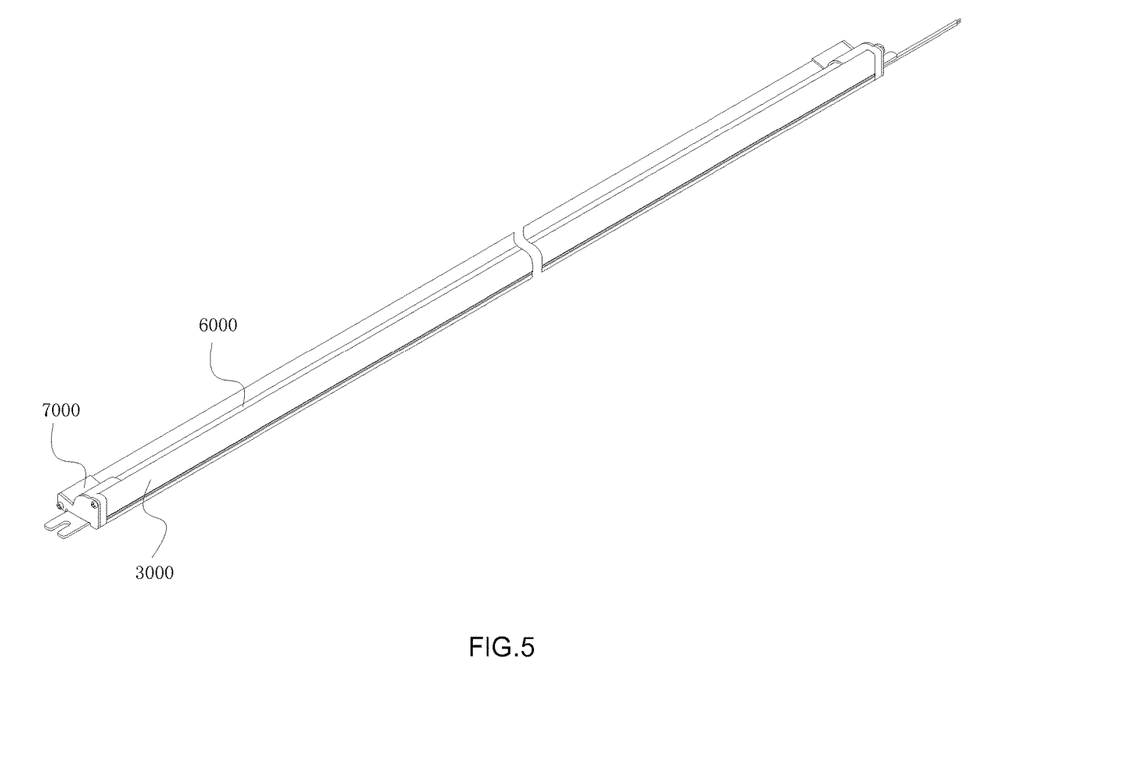
FIG. 5 is a schematic diagram of the structure of the lamp of embodiment 1.
Figure 6:
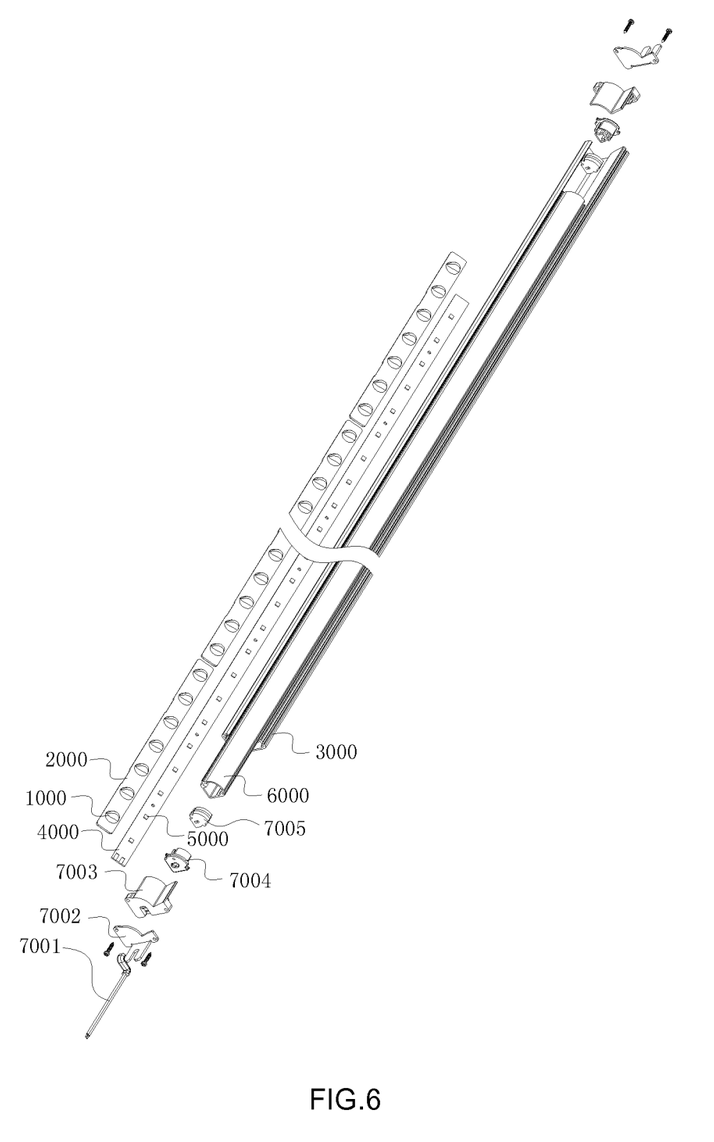
FIG. 6 is a schematic diagram of the exploded structure of the lamp of embodiment 1.
Figure 7:
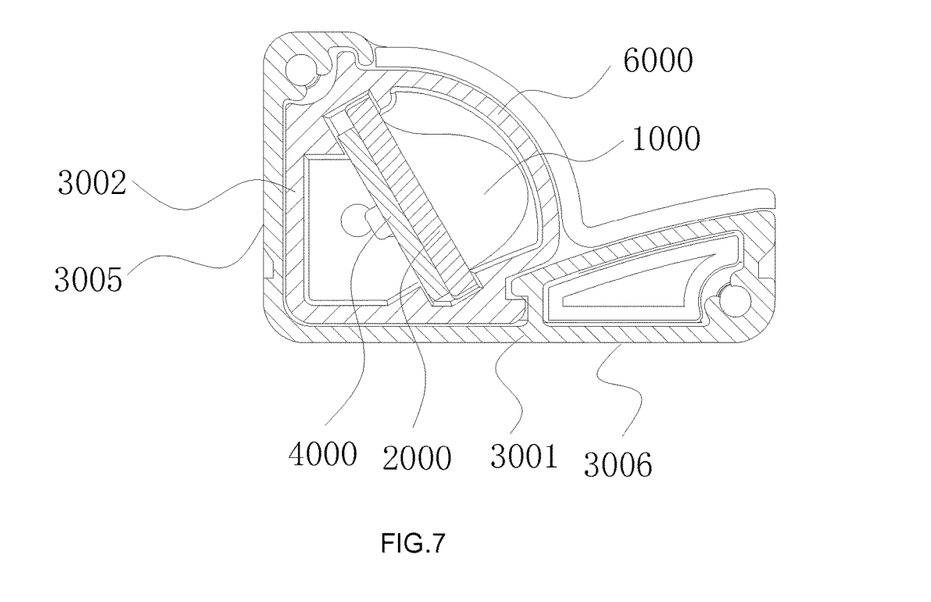
FIG. 7 is a schematic cross-sectional view of the lamp of embodiment 1.

The lamp of this embodiment includes a lamp holder 3000, a circuit board 4000, a light source 5000, a mounting plate 2000 with a lens 1000, a lamp cover 6000 and an end cover assembly 7000.

The lamp holder 3000 and the circuit board 4000 are in strips and their length direction extends along the direction of the second dimming axis 103. There are multiple light sources 5000 arranged at intervals along the second dimming axis 103. Correspondingly, a plurality of lens 1000 is arranged on the mounting plate 2000 and the lens 1000 is respectively arranged on the corresponding light source 5000. The circuit board 4000 is arranged on the lamp holder 3000; the light source 5000 is arranged on the circuit board 4000; the light source 5000 is arranged on the light source installation place 100 and the central axis of the light source installation place 100 is coincident with the main optical axis 101.

In the context of energy saving and environmental protection, LED lamps are increasingly used in home and commercial lighting because of their high light extraction efficiency and good light gathering performance. The light source 5000 uses LED chips.

In this embodiment, the end cover assembly 7000 includes an external wire 7001, a fixing plate 7002, an outer cover 7003, an inner cover 7004, and a sealing plug 7005. The end cover assembly 7000 can adopt the existing technology and is not the focus of this application, and will not be repeated here.

The lamp holder 3000 includes an alloy bracket 3001 and a fixing seat 3002. The alloy bracket 3001 is a strip structure with an L-shaped cross section. The outline border of the alloy bracket 3001 has a short side 3005 and a long side 3006 perpendicular to each other. The outline border is often used for installation and positioning. The fixing seat 3002 is installed inside the alloy bracket 3001. In order to facilitate the manufacture and improve the waterproof effect, the fixing seat 3002 and the lamp cover 6000 are integrally formed and connected to form a circumferentially sealed installation cavity 3003. The installation cavity 3003 is provided with a mounting groove 3004. After the mounting plate 2000 is fixed to the circuit board 4000, they are inserted into the mounting groove 3004 together and then fixed. The plane formed by the two sides of the mounting groove 3004 is inclined relative to the short side 3005, so that the circuit board 4000 is inclined and cooperated with the light distribution of the lens 1000 to achieve a large area of uniform lighting. This lamp is suitable for lighting such as displays and showcases.

Embodiment 2

Figure 8:
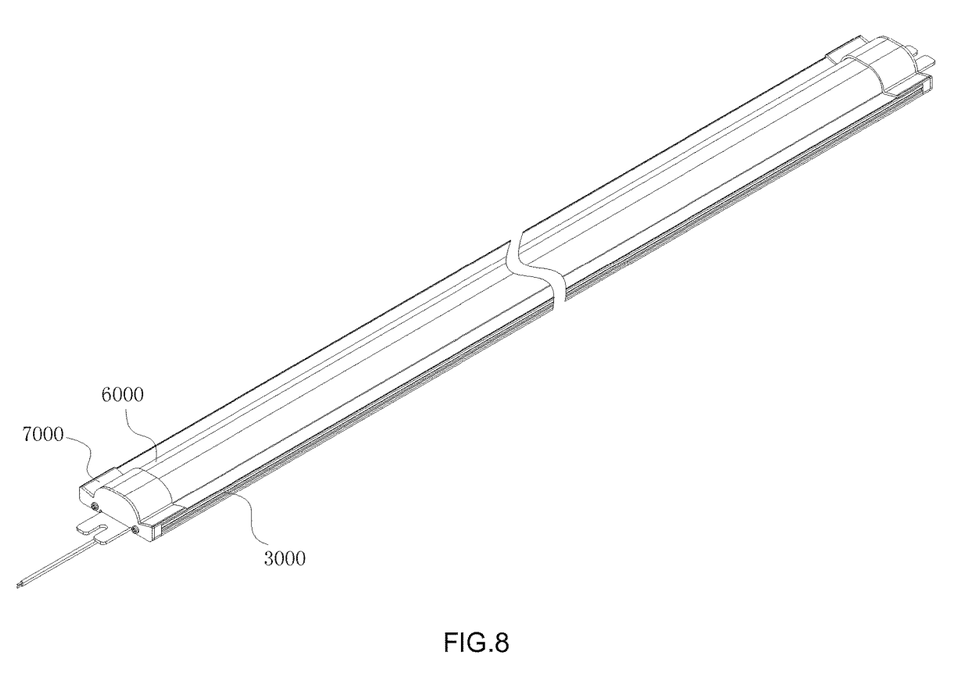
FIG. 8 is a schematic diagram of the structure of the lamp of embodiment 2.
Figure 9:
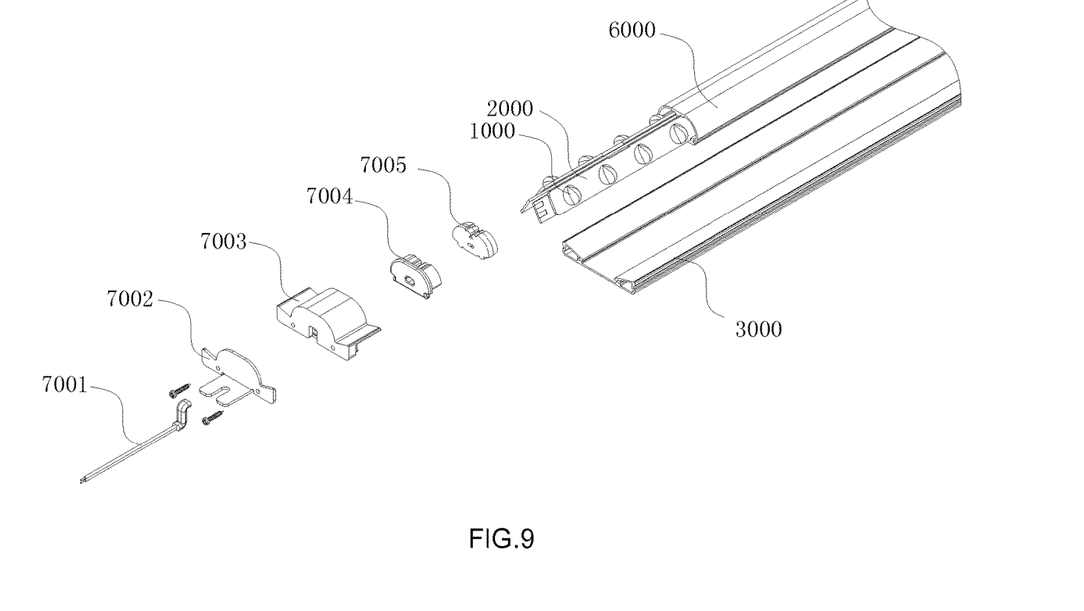
FIG. 9 is a schematic diagram of an exploded structure of the lamp of embodiment 2.
Figure 10:
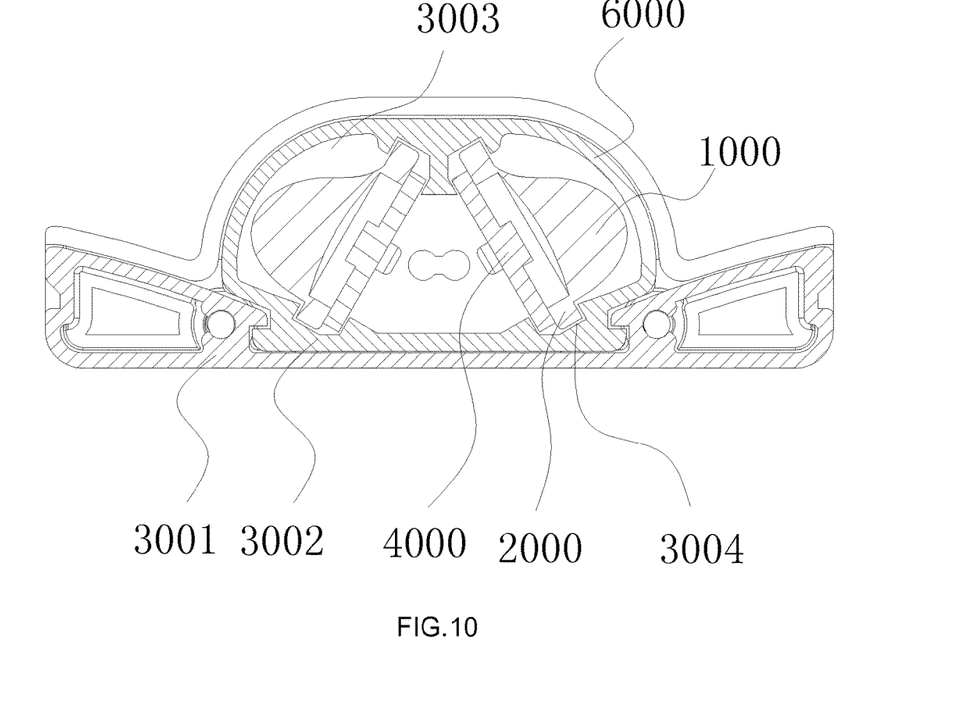
FIG. 10 is a schematic cross-sectional view of the lamp of embodiment 2.

As shown in FIGS. 8-10, in order to achieve a wider range of illumination, two rows of light sources 5000 are provided in this embodiment. In order to provide these light sources, the circuit board 4000 is provided with two, the width directions of which are symmetrical and oblique to each other. The structure of the lens and parts of the lamp are the same as in the first embodiment.

In this embodiment, the outer bottom surface of the alloy bracket 3001 is a horizontal mounting surface, and the inner side of the alloy bracket 3001 is provided with a fixing groove which is used to install the fixing seat 3002, and the fixing seat 3002 is provided with two symmetrically arranged mounting grooves 3004. As shown in FIG. 10, in the cross section of the lamp, one side of the two mounting grooves 3004 are close up to each other, so that the plane formed by connecting the two sides of the mounting groove 3004 is symmetrical and inclined, so that the circuit boards 4000 arranged in the mounting groove 3004 are symmetrical and inclined in the width direction. The two circuit boards 4000 are installed corresponding to the lens 1000, and the sides with the diffusion curved surface 202 are close to each other, so as to diffuse the light irradiated to the middle area (near end or proximal end) and converge the light on both sides to improve the uniformity of the overall illumination. It is convenient to manufacture and improve the waterproof effect. The fixing seat 3002 and the two lamp covers 6000 are integrally formed and connected to form a circumferentially sealed installation cavity 3003.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

What is claimed is:

1. A lens, comprising a light source installation location (100), a second lens surface (200) and a first lens surface (300), the light source installation location (100) has a main optical axis (101) passing through the second lens surface (200) and the first lens surface (300), and on a plane perpendicular to the main optical axis (101), there are a first dimming axis (102) and a second dimming axis (103) that are perpendicular to each other and intersecting the main optical axis (101), characterized in that, the first lens surface (300) includes a first light-focusing curved surface (201) located along the direction of the first dimming axis (102) and on one side of the main optical axis (101), and at least part of the first lens surface (300) on the other side of the main optical axis (101) is a diffusion curved surface (202); the first lens surface (300) includes a second light-focusing curved surface (301) along the direction of the second dimming axis (103).

2. The lens as claimed in claim 1, wherein the first light-focusing curved surface (201) and the diffusion curved surface (202) are connected by a third light-focusing curved surface (203).

3. The lens as claimed in claim 2, wherein the curvature of the third light-focusing curved surface (203) gradually decreases from the first light-focusing curved surface (201) toward the diffusion curved surface (202).

4. The lens as claimed in claim 3, wherein the second lens surface (200) is a concave arc surface along the main optical axis (101) toward the first lens surface (300), and the light source installation location (100) is located outside the second lens surface (200).

5. The lens as claimed in claim 2, wherein the second lens surface (200) is a concave arc surface along the main optical axis (101) toward the first lens surface (300), and the light source installation location (100) is located outside the second lens surface (200).

6. The lens as claimed in claim 2, wherein the first light-focusing curved surface (201), the third light-focusing curved surface (203) and the diffusion curved surface (202) is in smooth transition connection.

7. The lens as claimed in claim 1, wherein the second lens surface (200) is a concave arc surface along the main optical axis (101) toward the first lens surface (300), and the light source installation location (100) is located outside the second lens surface (200).

8. A lens group, characterized by comprising a plurality of lenses (1000) as claimed in claim 1, and the lenses (1000) are arranged at intervals along the second dimming axis (103).

9. The lens group as claimed in claim 8, wherein the lens group further comprises a mounting plate (2000) for fixing the lens (1000).

10. The lens group as claimed in claim 9, wherein the mounting plate (2000) is provided with a plurality of mounting holes (2001), and each mounting hole (2001) is correspondingly provided with a lens (1000) and connected with the second lens surface (200).

11. The lens group as claimed in claim 9, wherein the mounting plate (2000) and the lens (1000) are integrally formed and manufactured.

12. A lamp, comprising:
lamp holder (3000);
circuit board (4000), set on the lamp holder (3000);
light source (5000), arranged on the circuit board (4000);
lens (1000), adopting the lens as claimed in claim 1, and the light source (5000) is arranged on the light source installation place (100) and the central axis of the light source installation place (100) is coincident with the main optical axis (101).

13. The lamp as claimed in claim 12, wherein the lamp holder (3000) and the circuit board (4000) are in strips and their length direction extends along the second dimming axis (103), and there are a plurality of light sources (5000) arranged at intervals along the second dimming axis (103), and correspondingly, a plurality of lens (1000) is respectively arranged on the corresponding light source (5000).

14. The lamp as claimed in claim 13, wherein the circuit board (4000) is provided with two, the width directions of which are symmetrical and oblique to each other, and the light source (5000) is arranged on the outer side of the circuit board (4000).

15. The lamp as claimed in claim 12, wherein the circuit board (4000) is provided with two, the width directions of which are symmetrical and oblique to each other, and the light source (5000) is arranged on the outer side of the circuit board (4000).

* * * * *